Oct. 23, 1928.

B. F. SCHMIDT 1,688,750

GEAR SHIFT MECHANISM

Filed Jan. 11, 1927   2 Sheets-Sheet 1

INVENTOR
*B.F. Schmidt*

BY
ATTORNEY

Oct. 23, 1928.
B. F. SCHMIDT
1,688,750
GEAR SHIFT MECHANISM
Filed Jan. 11, 1927 2 Sheets-Sheet 2
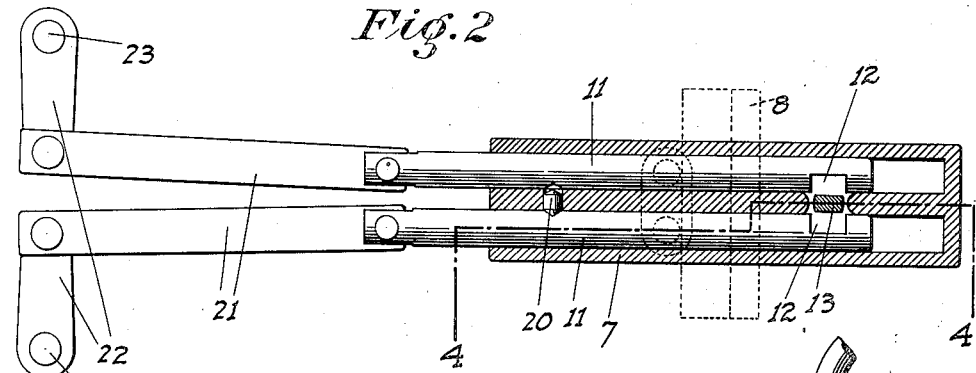
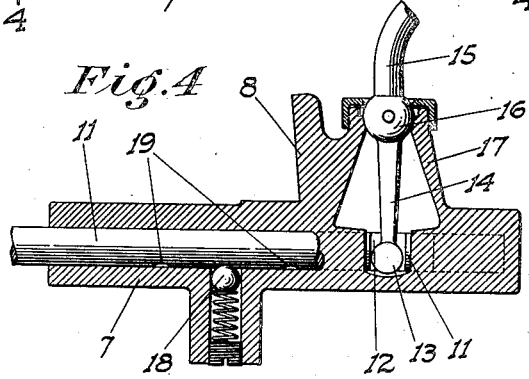
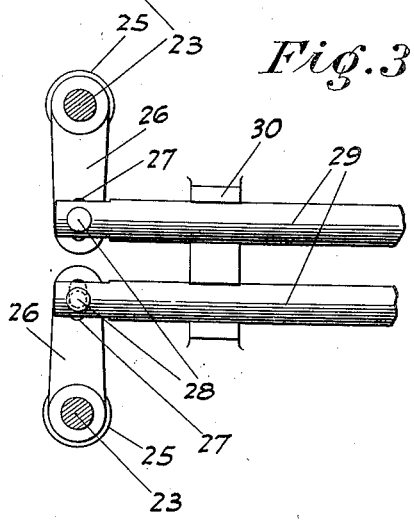
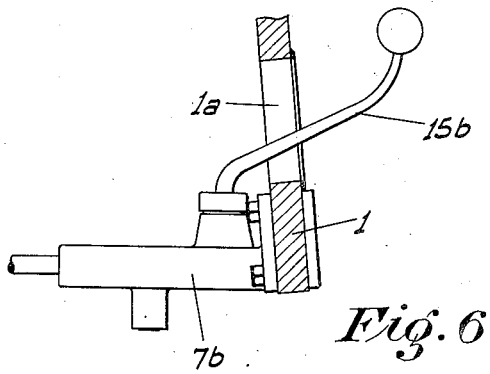
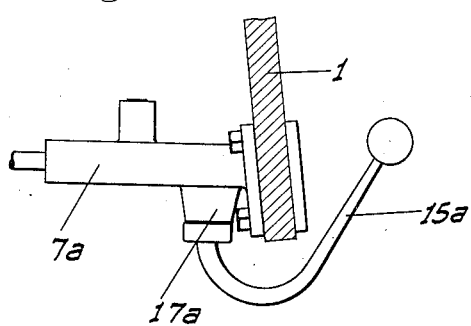
INVENTOR
*B.F. Schmidt*
BY
ATTORNEY Patented Oct. 23, 1928.

1,688,750

UNITED STATES PATENT OFFICE.

BENJAMIN F. SCHMIDT, OF LOS ANGELES, CALIFORNIA.

GEAR-SHIFT MECHANISM.

Application filed January 11, 1927. Serial No. 160,365.

This invention relates to improvements in gear shift mechanisms for motor vehicles, and particularly represents improvements over the structures shown in my co-pending applications for patent, Serial No. 116,574, filed June 17th, 1926, and Serial No. 117,137, filed June 19th, 1926.

The desired end to be attained in the present device, as in the previous ones, is the provision of a gear shift mechanism which will eliminate the need of a lever upstanding from the floor of the car as is usual and which will thereby leave the floor clear for the feet of the occupants. The previous mechanisms, however, required that shifting operations be carried out with movements different from those ordinarily performed; and I have found that there is a distinct disinclination on the part of manufacturers and the driving public to adopt or install any mechanism of this nature if the operating movements are not according to what is ordinarily known as the standard shift.

The principal object of the present invention therefore is to provide a gear shift mechanism which has all the advantages of those shown in the former applications, in keeping the floor clear of any projecting levers, but which in addition makes use of an operating lever which moves in the identical manner for gear shifting purposes as the ordinary lever which depends through the floor of the car directly into the transmission casing. The advantages of a clear floor is therefore had, while at the same time the driver may operate the improved mechanism without having to lear such operation, or change his previously learned shifting knowledge or habits in any way.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a plan section of the upper portion of the mechanism, taken on the line 2—2 of Fig. 1.

Fig. 3 is a fragmentary plan section of the lower portion of the mechanism taken on the line 3—3 of Fig. 1.

Fig. 4 is a longitudinal section of the mechanism taken on the line 4—4 of Fig. 2.

Figs. 5 and 6 are side elevations of modified forms of the operating unit showing differently arranged operating levers.

Figure 1:
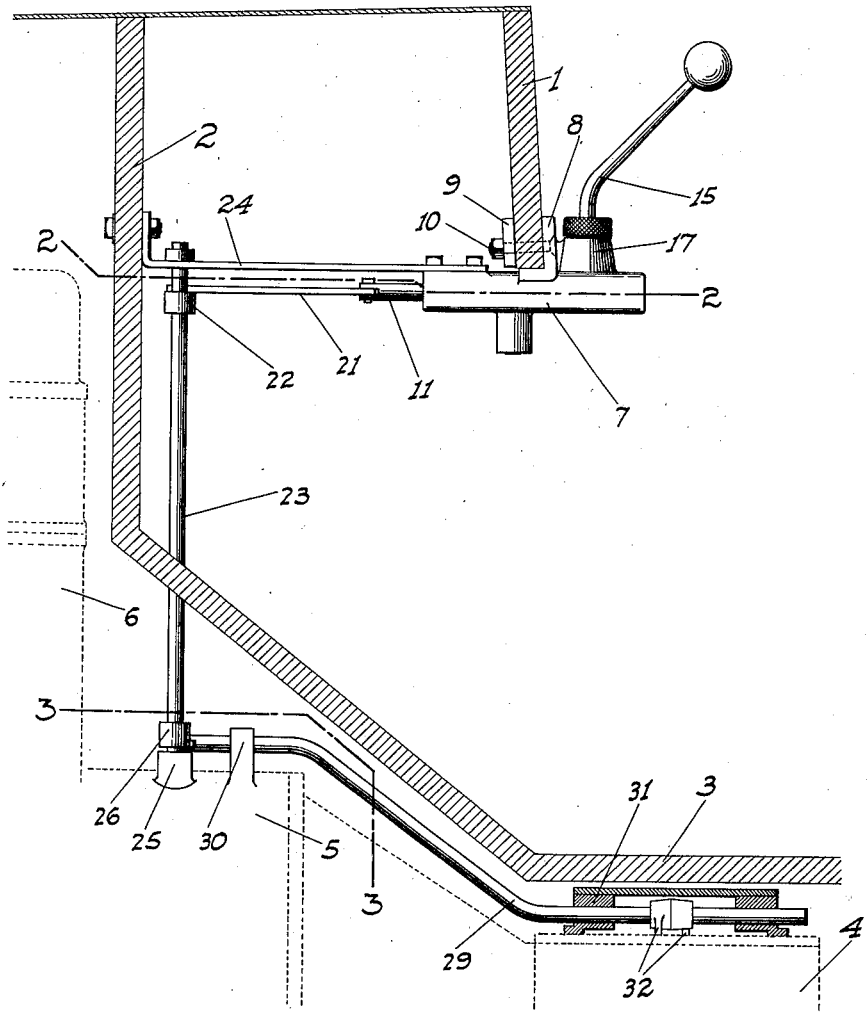
Fig. 1 is a side elevation of my improved gear shift mechanism shown as installed in a motor vehicle.

Referring now more particularly to the characters of reference on the drawings, the numeral 1 denotes the dashboard of a motor vehicle; 2 the engine bulkhead which as usual is a certain distance ahead of the dashboard; 3 is the floor of the driver's compartment of the vehicle; 4 the transmission housing under the floor; and 5 is the flywheel housing of the engine 6, said housing being located under the bulkhead 2. My improved gear shift mechanism to shift the usual gears in the housing 4 in the usual manner comprises a casing 7 arranged to extend longitudinally of the vehicle and disposed centrally of the width thereof (or in vertical alinement with the transmission mechanism) just under the dashboard. This casing is provided with a vertical transversely extending flange or pad 8 projecting upwardly therefrom intermediate its ends to engage the rear or outer face of the dashboard. A plate 9 is placed against the opposite face of the dashboard, bolts 10 extending through the dashboard, plate and pad to clamp the same firmly together and thus rigidly support the casing from the dashboard.

Slidable in the casing is a pair of transversely spaced rods 11, vertical notches 12 being cut in the adjacent faces of the said rods adjacent their rear ends or rearwardly of the dashboard. Adapted to enter either notch is a head 13 formed on the lower end of an arm 14 which in turn is formed in connection with an operating lever 15. The junction between the arm and lever is as usual in the form of a ball 16 which is swivelly mounted for universal movement in an extension 17 which is formed with and projects upwardly from the housing 7 rearwardly of the dashboard.

It will therefore be seen that I have arranged, just under the dashboard, an operating unit in which the rods 11 correspond to the usual shifting rods in the transmission housing and to which the gear shifting forks are attached; and in which the lever member 15 is arranged to move to selectively shift the rods 11 in the indentical manner and direction as the usual gear shifting rods are moved by the movement of the ordinary floor-projecting shift lever.

To hold the rods 11 at any position to which they may be moved I mount a spring pressed ball 18 or the like in the housing for each rod to engage notches 19 in said rod spaced the proper longitudinal distance apart. An additional interlocking pin 20 is mounted in the housing 7 between the rods, this pin being arranged to prevent one rod from moving from a neutral position while the other one is being shifted.

The rods 11 project beyond the forward end of the housing 7 and at their forward ends are connected to links 21. At their forward ends these links are connected to the outer ends of arms 22 which project toward each other from vertical rods or shafts 23 which are located a short distance rearwardly of the bulkhead 2. These rods are supported and journaled at their upper ends in a bracket plate 24 which is secured at one end to the bulkhead 2 and at the other end to the housing 7. The rods 23 project through the forward portion of the floor 3 and at their lower ends are turnable in bosses 25 secured to or formed integral with the flywheel housing 5. Projecting toward each other from the rods 23 just above the bosses 25 are radial arms 26, disposed parallel to the arms 22. These arms are longitudinally slotted as at 27 toward their outer ends to engage pins 28 mounted on the forward ends of rigid horizontal rods 29.

Guide members 30 to insure straight longitudinal movement of said rods 29 project upwardly from the housing 5 to engage said rods a short distance rearwardly of the arms 26. The rods 29 are bent downwardly intermediate their ends so as to follow the contour of the power plant enclosures between the housing 5 and the transmission housing 4 in spaced relation to said housing, and to the floor 3. At their rear ends said rods are horizontal and are slidably mounted in a cover member 31 which is mounted over the transmission housing and replaces the usual member in which the ordinary shifting member is mounted. Attached directly to the rods 29 inside the cover 31 are the usual gear shifting forks 32 which occupy the same positions as ordinarily are occupied by said forks. In other words the portions of the rods 29 directly over the transmission housing replace the usual rods to which the shifting forks are ordinarily connected and may occupy the same positions as said rods. It will therefore be seen that with the foregoing arrangement of parts the gear shifting structure is kept entirely clear of the floor of the car, while the movement of the lever 15 to shift the gears is the same as is had with the so-called standard shift structure in which the operating lever directly engages the equivalent of the rods 29. For instance to shift the gears to low gear position the upper end of the lever 15 is moved toward the left and then pulled back. This, as will be evident, causes the head 13 to engage the notch 12 of the right hand rod 11 and the latter will be moved forwardly.

Such movement of the rod imparts a similar movement to the corresponding rod 29 to shift the gears controlled by the fork mounted on said rod. The direction of movement of the rod 29 and the fork thereon is therefore the same as that of the ordinary shifting rod when connected direct to the shifting lever as usual.

It is to be noted that the member 24 has a valuable function other than serving as a bearing for the rods 23. This member is also a brace between the substantially strong bulkhead 2 and the relatively weak dashboard 1, preventing the latter from any give at the place where the member 7 is mounted when the lever 15 is manipulated. This is highly essential since any relative movement between the upper supporting structure of the shifting mechanism and the transmission below would unduly strain the parts and would set up undue wear and sooner or later cause either a binding or an undesired looseness of play of the operating members.

Though I prefer the arrangement and mounting of the operating lever and the supporting housing 7 as shown in Fig. 1, the lever may if desired be arranged as shown in Figs. 5 and 6.

In Fig. 5 the housing 7ª is placed entirely ahead of the dashboard and is inverted in position. The lever 15ª therefore projects down from the inverted extension 17ª and is then bent upwardly so that its outer end is rearwardly of the dashboard and in an upwardly facing position.

In Fig. 6 the housing 7ᵇ is also entirely forward of the dashboard but is set in the same position as that in Fig. 1. The lever 15ᵇ however is somewhat longer than the lever 15 and projects through a slot 1ª cut in the dashboard above the housing 7ᵇ.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gear shift mechanism for a motor vehicle including a pair of transversely spaced rods extending longitudinally of the vehicle, a shifting lever arranged in connection with the rods to selectively move the same longitudinally, a casing in which said rods and lever are mounted, means for securing said casing in direct connection with the dashboard of the vehicle, a pair of vertical and transversely spaced shafts mounted ahead of the casing, radial arms projecting transversely from the shafts in substantial horizontal alinement with the rods, connections between said arms and rods, and connections between said arms and the gear shift forks of the transmission mechanism of the vehicle to cause the latter to move in the same direction as the corresponding rods with the movement of said rods.

2. A gear shift mechanism for a motor vehicle including a pair of transversely spaced rods extending longitudinally of the vehicle, a shifting lever arranged in connection with the rods to selectively move the same longitudinally, a casing in which said rods and lever are mounted, means for securing said casing in direct connection with the dashboard of the vehicle, a pair of vertical and transversely spaced shafts mounted ahead of the casing, radial arms projecting transversely from the shafts in substantial horizontal alinement with the rods, connections between said arms and rods, other arms projecting from the shafts adjacent their lower ends, and longitudinal rods extending from the outer ends of said last named arms over the transmission housing of the vehicle; said last named rods being directly connected to the gear shift forks of the transmission.

3. A gear shaft mechanism for a motor vehicle including a pair of transversely spaced rods extending longitudinally of the vehicle, a shifting lever arranged in connection with the rods to selectively move the same longitudinally, a casing in which said rods and lever are mounted, means for securing said casing in direct connection with the dashboard of the vehicle, a pair of vertical and transversely spaced shafts mounted ahead of the casing, and extending from a plane substantially in horizontal alinement with the rods through the floor of the vehicle, connections between said rods and shafts to cause the latter to be rotated with the longitudinal movement of the rods, and connections between the shafts under the floor and the gear shift forks of the transmission mechanism of the vehicle for moving said forks longitudinally with the rotation of the shafts.

4. A gear shift mechanism for a motor-vehicle having a dashboard, including a pair of vertical shafts turnably mounted ahead of the dashboard, connection means between the shafts and the shifting forks of the transmission mechanism of the vehicle for causing such forks to be shifted with the rotation of the shafts, a casing secured on the dashboard, a pivoted shift lever projecting upwardly from said casing, and selective connection means between the shafts and lever for causing said shafts to be turned when the lever is swung longitudinally of the vehicle.

5. In a gear shift mechanism, the combination with a motor vehicle having a dashboard and a bulkhead in front of the dashboard and in spaced relation thereto, a shift-lever support mounted on the dashboard, and a rigid brace member, connected to the support and projecting forwardly to a rigid connection with the bulkhead.

6. In a gear shift mechanism, the combination with a motor vehicle having a dashboard and a bulkhead in front of the dashboard and in spaced relation thereto, a shift-lever support mounted on the dashboard, and rigid means connecting the dashboard with the bulkhead in a manner to prevent any yield of the dashboard adjacent the lever support.

In testimony whereof I affix my signature.

BENJAMIN F. SCHMIDT.